Dec. 17, 1963  G. T. MOO  3,114,355
INTERNAL COMBUSTION ENGINE
Filed Aug. 9, 1960  8 Sheets-Sheet 1

INVENTOR
Gothard T. Moo
BY
Salter + Mickaelson
ATTORNEYS

Dec. 17, 1963 G. T. MOO 3,114,355
INTERNAL COMBUSTION ENGINE
Filed Aug. 9, 1960 8 Sheets-Sheet 4

INVENTOR
Gothard T. Moo
BY Salter + Michaelson
ATTORNEYS

INVENTOR
Gothard T. Moo
BY
Salter + Michaelson
ATTORNEYS

Dec. 17, 1963     G. T. MOO     3,114,355
INTERNAL COMBUSTION ENGINE
Filed Aug. 9, 1960     8 Sheets-Sheet 7
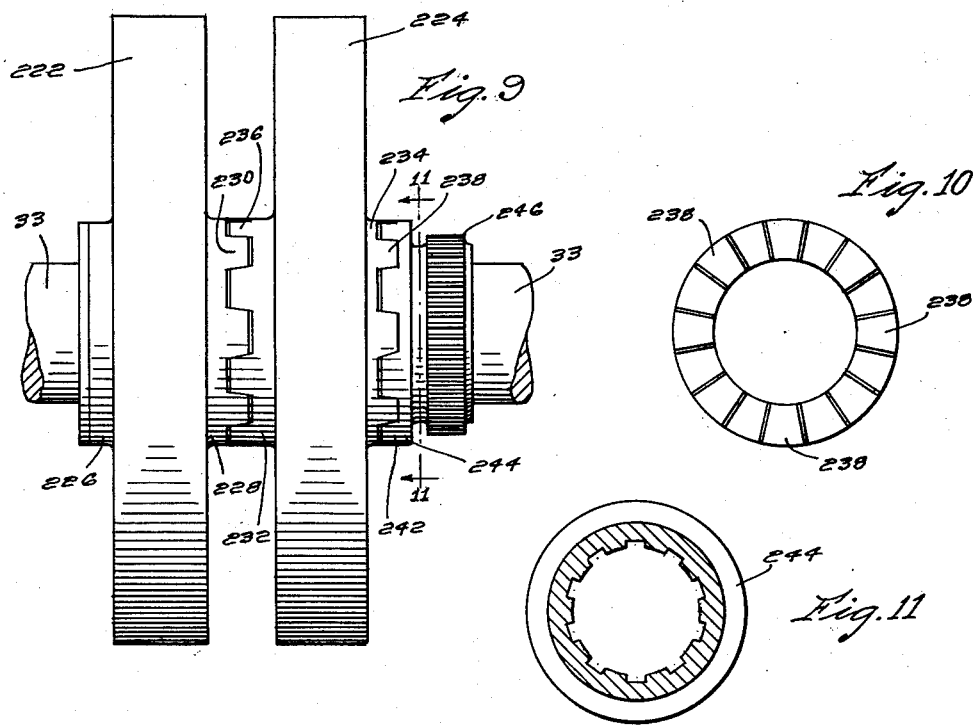
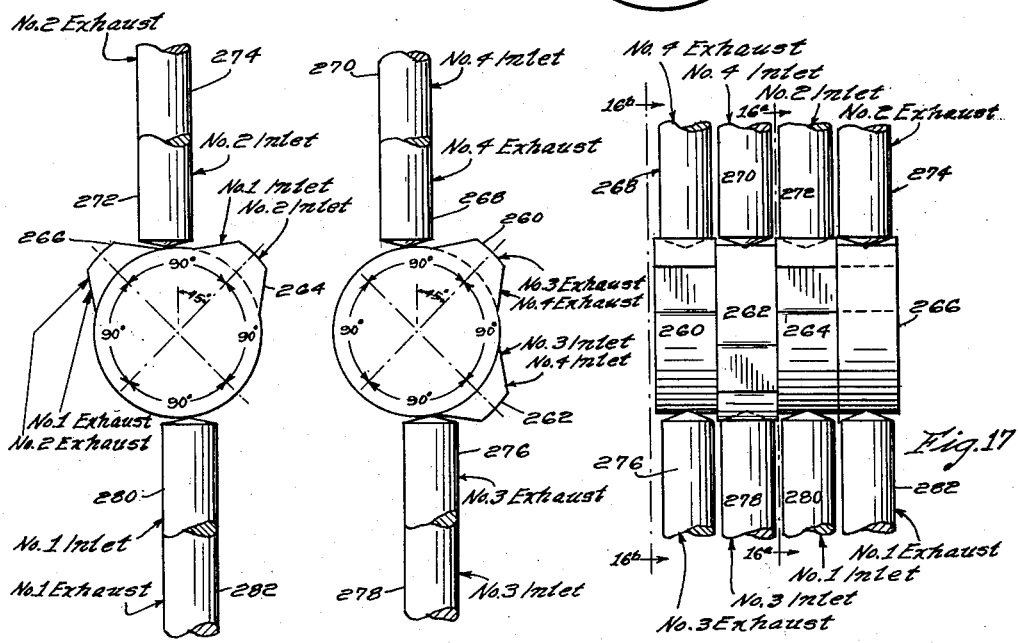
INVENTOR
Gothard T. Moo
BY Salter & Michaelson
ATTORNEYS Dec. 17, 1963   G. T. MOO   3,114,355
INTERNAL COMBUSTION ENGINE
Filed Aug. 9, 1960   8 Sheets-Sheet 8

INVENTOR
Gothard T. Moo
BY
Salter + Michaelson
ATTORNEYS

United States Patent Office 3,114,355
Patented Dec. 17, 1963

3,114,355
INTERNAL COMBUSTION ENGINE
Gothard T. Moo, Cranston, R.I., assignor to Weskenson Corporation, Cranston, R.I., a corporation of Rhode Island
Filed Aug. 9, 1960, Ser. No. 48,483
14 Claims. (Cl. 123—54)

The present invention relates to an internal combustion engine. More particularly, the present invention relates to a four-cylinder internal combustion engine that incorporates a roller clutch drive therein for translating reciprocating motion into continuous rotary motion.

The internal combustion engine in common use today has achieved some measure of efficiency due to improved techniques in machining and use of new materials which enable closer tolerances to be effected. Furthermore, higher compression ratios and improved methods of carburetion have enabled higher horsepower ratings to be obtained in the family car than at any time heretofore. Even though the prior known internal combustion engine has been found to be satisfactory for normal usage, it is known that due to the use of the conventional crankshaft and associated camshaft a tremendous amount of available power is lost, and furthermore, due to the various connections between the crankshaft and the pistons of the engine, losses due to friction and wear reduce the available power of the engine. One of the chief objections to the heretofore-known internal combustion engine is its lack of compactness in size, which necessitates a fairly generous usage of space in the application thereof. For example, in an automobile, the engine occupies a more than proportionate amount of space, thereby increasing the overall length of the automobile. This space necessary to accommodate the heretofore-known internal combustion engine is due primarily to the configuration of the engine block which is shaped in accordance with the position of cylinders formed therein. Since all conventional automobiles use an engine having either in line or V-type cylinders, the block must be constructed in a manner to accommodate such an arrangement.

In contrast with the heretofore-known internal combustion engine, the present invention includes only four cylinders that are utilized in conjunction with clutches of the overrunning type, such as shown in Patent No. 2,892,522, issued June 30, 1959, for Overrunning Clutches. In the engine embodied herein the axes of the cylinders, in which pistons are adapted to be reciprocably mounted, are disposed in substantially horizontal position and are located perpendicular with respect to the shaft that is adapted to be driven through the overrunning clutch system. The overrunning clutches are operatively connected to the pistons of the engine and translate the reciprocating motion of the pistons into a continuous rotary motion of the shafts associated therewith, thereby enabling the propulsive force of the pistons to be transmitted to the shaft through constant or nearly constant torque radii. By using only four pistons in combination with the overrunning clutches, a constant torque is obtained and a nearly vibrationless system is produced. The invention also incorporates a valve system that is controlled by cams connected directly to the drive shaft of the engine so that for one revolution of the drive shaft a four-stroke cycle is possible, thus producing more explosions with fewer cylinders than in those engines known heretofore. For example, in a six-cylinder crank engine, one explosion is obtained every 120 degrees of rotation of the shaft. Thus, each cylinder in its power stroke moves the other five cylinders through 120 degrees in various positions thereof. Similarly, in an eight-cylinder crank engine, one explosion is obtained every 90 degrees of the rotation of the drive shaft. Thus, each power stroke of a cylinder moves seven of the other pistons in their various positions. In the present invention, there are at least four strokes in each piston cycle for one revolution of the drive shaft and thus in contrast with the prior known engine more explosions are produced with a fewer number of cylinders.

Accordingly, it is an object of the present invention to provide an internal combustion engine that incorporates overrunning clutches therein to drive the engine shaft with a continuous, rotary motion.

Another object of the invention is to provide a plurality of cylinders and pistons, the axes of which are substantially horizontal thereby forming a relatively flat engine block construction.

Still another object is to provide an inlet and exhaust valve control system for use in an internal combustion engine wherein the valve system is responsive directly to the rotation of the drive shaft and cams mounted thereon.

Still another object is to provide a pair of cam members that cooperate with a linkage system for producing a reciprocating motion in the overrunning clutches embodied herein during the starting phase of the engine.

Still another object is to provide an engine wherein each piston cycle includes at least four strokes for one revolution of the drive shaft thereby increasing the number of explosions per cylinder.

Still another object is to provide a clutch mechanism that connects the drive shaft of the engine to a pair of cam members, the cam members being utilized in connection with a linkage system, for imparting a starting torque to the engine and for acting as a brake during the normal operation thereof.

Still another object is to provide a bevel gear assembly for use with a pair of overrunning clutches, the bevel gear assembly being disposed between the overrunning clutches and synchronizing the movement thereof so that translation of the reciprocating movement of the clutches through a rotating drive shaft will be as nearly vibrationless as possible.

Still another object is to provide a system for operating engine accessories, wherein the drive for said accessories is connected directly to the drive shaft of the engine.

Still another object is to provide a novel manifold system for use in the internal combustion engine embodied herein, the manifold system cooperating with valve control means to introduce fuel into the combustion chambers of the engine cylinders and to remove the exhaust products therefrom.

Other objects, features and advantages of the invention will become apparent as the description thereof proceeds when considered in connection with the accompanying illustrative drawings.

In the drawings which illustrate the best mode presently contemplated by me for carrying out my invention:

FIG. 9 is an enlarged view of the large cam members that are mounted on the drive shaft, the clutches for the cam members and the spline to the drive shaft being shown in detail;

FIG. 10 is an end view of one of the clutches illustrated in FIG. 9, showing the formation of the splines therein;

FIG. 11 is a sectional view taken along line 11—11 in FIG. 9;

FIG. 16a is a view of cams 264 and 266 taken along line 16a—16a in FIG. 17 and showing the relationship of the push rods associated therewith;

FIG. 16b is an end view of cams 260 and 262 showing the relationship of the push rods associated therewith; and FIG. 17 is an enlarged bottom plan view of the valve control cams, the push rods with which they are associated being shown in engagement therewith.

Traditionally, internal combustion engines have included an engine block in which the engine cylinders were formed in either groups of four, six or eight cylinders and were arranged in lines or in groups of four in a V configuration. In the V type of engine, the axes of the cylinders were inclined with respect to the vertical while in the in-line engines the axes of the cylinders were substantially vertical in normal usage. The present invention is a departure from these prior known types of internal combustion engines and includes a plurality of cylinders, the axes of which are located in a horizontal plane.

Figure 1:
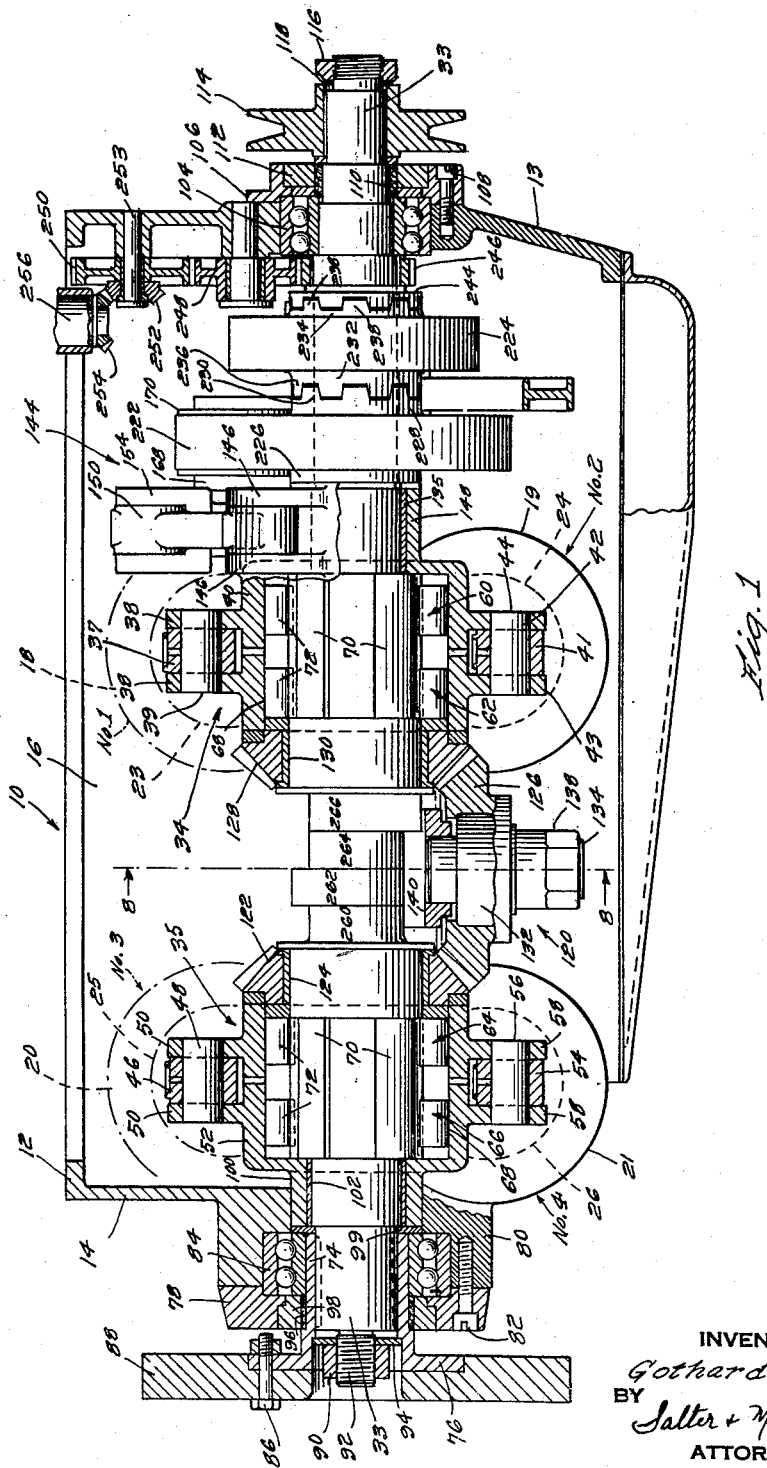
FIG. 1 is a vertical sectional view of the internal combustion engine embodied herein showing in particular the interrelation of the overrunning cltuches that are operatively mounted on the engine drive shaft.
Figure 2:
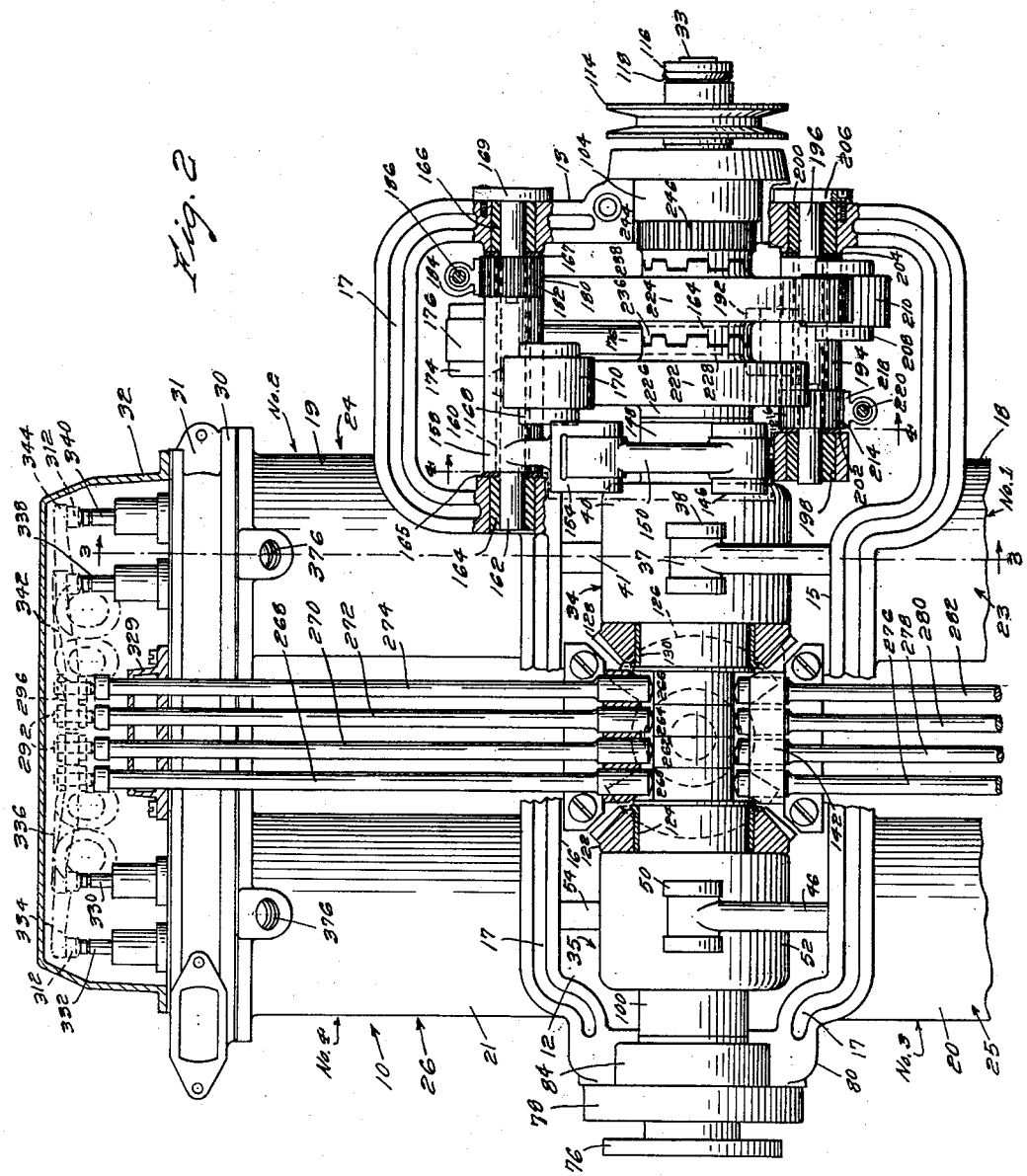
FIG. 2 is a top plan view of the engine illustrated in FIG. 1 with parts shown in section and with the top of the engine block removed to show the interrelation of the overrunning clutches with the linkage system operatively connected thereto, and to further show the cams that operate the valve control mechanism.

Referring now to the drawings and particularly to FIGS. 1 and 2, the engine embodied herein is shown comprising an engine block generally indicated at 10 which includes a two-part central housing 12 that is defined by end walls 13 and 14 and side walls 15 and 16. As shown in FIG. 2, the right side of the housing is somewhat wider than the remaining portion for accommodating a linkage system and drive cam assembly which will be described hereinafter. In order to prevent oil leakage in the central housing 12, the joints thereof are formed with drain passages therein that are indicated at 17 in FIG. 2.

Figure 3:
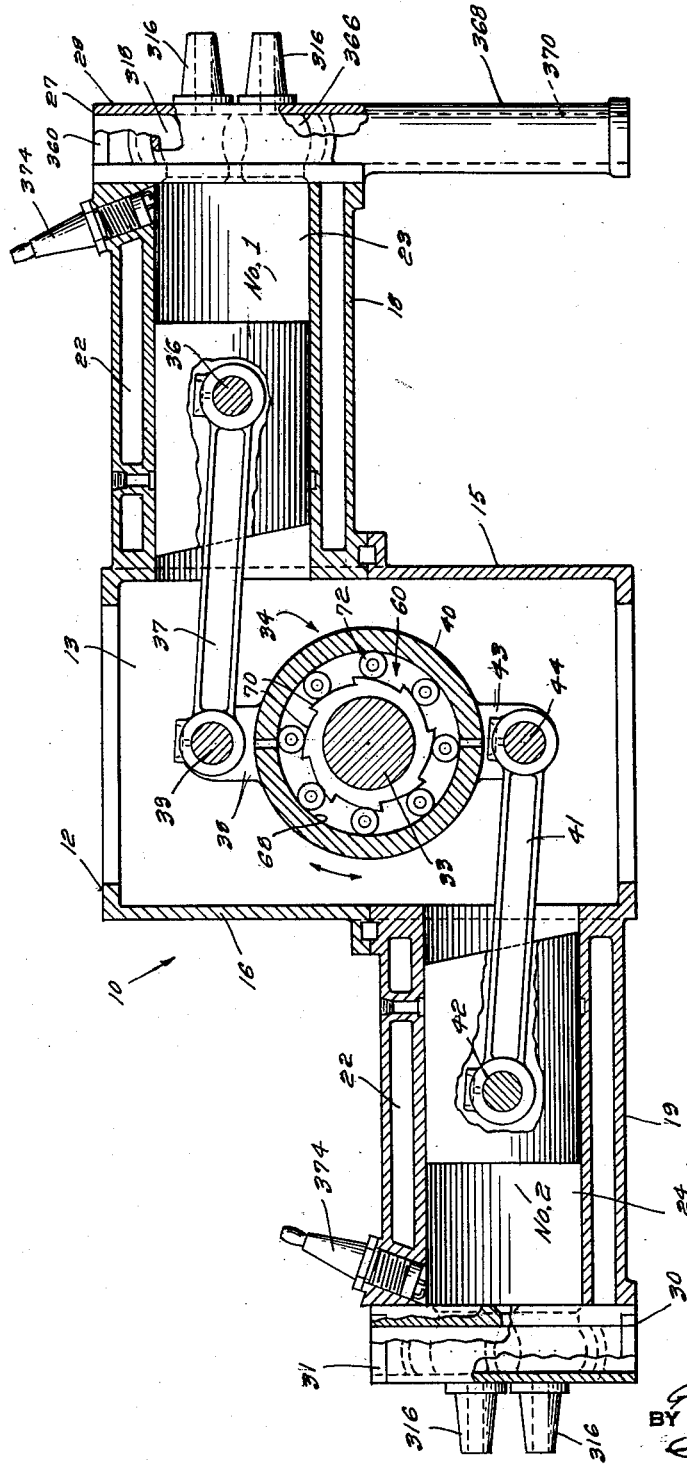
FIG. 3 is a sectional view taken along line 3—3 in FIG. 2.

Joined to the central housing 12 and projecting outwardly therefrom are four equally formed cylindrical extensions 18, 19, 20 and 21, the extensions 18 and 20 being joined to the upper portion of the side wall 15 in spaced relation and the extensions 19 and 21 projecting in the opposite direction with respect to the extensions 18, 20, and being joined to the lower portion of the central housing side wall 16 in spaced relation with respect to each other. Each of the extensions 18, 19, 20, 21 is formed with an annular cooling chamber 22 that is defined by the outer wall thereof and an annular inner wall, the inner walls of each extension defining a cylinder, the cylinders so formed being indicated in FIG. 1 at 23, 24, 25 and 26. The cylinders 23 and 25 form the upper cylinders of the engine while the cylinders 24 and 26 define the lower cylinders thereof. As shown in FIG. 3, the upper cylinder 23 and the lower cylinder 24 are disposed in opposed relation. Similarly, the upper cylinder 25 and the lower cylinder 26 are positioned in opposed relation and as will be described hereinafter, pistons are located in each of the cylinders and are adapted to operate in a predetermined sequence to produce a driving torque for the drive shaft of the engine.

Formed integral with the outer end of the extensions 18 and 20 is an outer block portion 27 on which a manifold casing 28 is mounted. The manifold casing 28 is provided with suitable ports and openings that communicate with the interior of the cylinders 23 and 25 for introducing fuel and discharging exhaust products from the cylinders as will hereinafter be described. A cover 29 is removably secured to the casing 28 and encloses the valve assemblies. As shown in FIG. 2, the opposite end of the engine is similarly constructed and includes an outer block portion 30 on which a manifold casing 31 is mounted. A cover 32 is removably secured to the manifold casing 31 and encloses the valve assemblies associated with the cylinders 24 and 26.

Extending through the central housing 12 of the engine block 10 and journalled for rotation therein is a drive shaft 33 on which are mounted in driving relation therewith a pair of overrunning clutch members generally indicated at 34 and 35. The overrunning clutch members 34 and 35 are disposed within the central housing 12 in spaced relation on the drive shaft 33 and are of the type illustrated and described in Patent No. 2,892,522.

Positioned in each of the cylinders 23, 24, 25 and 26 for reciprocating movement therein are pistons which for purposes of clarity are indicated at 1, 2, 3 and 4 respectively. Thus are shown in FIG. 3, piston No. 1 is disposed in cylinder 23, while piston No. 2 is mounted in cylinder 24. It is understood that the similarly formed pistons Nos. 3 and 4 are also mounted for reciprocating movement within the cylinders 25 and 26 respectively. Pivotally connected to piston No. 1 by a wrist pin 36 is a connecting rod 37 that, in turn, is pivotally connected to spaced lugs 38 by a pin 39, the lugs 38 being integrally joined to an outer housing 40 that is formed as part of the overrunning clutch 34. Similarly, one end of a connecting rod 41 is joined to piston No. 2 by a wrist pin 42 and the other end thereof is connected to spaced lugs 43 by a pin 44, the lugs 43 being integrally joined to the clutch housing 40 at a point displaced 180° from the lugs 38.

As shown in FIG. 1, pistons Nos. 3 and 4 located in cylinders 25 and 26 respectively are connected to clutch member 35 in a manner similar to that just described with respect to clutch 34. Thus piston No. 3 located in cylinder 25 is pivotally secured to a connecting rod 46. The connecting rod 46 is, in turn, pivotally secured by a pin 48 to spaced lugs 50 joined to a housing 52 that is formed as part of clutch member 35. Piston No. 4 located in cylinder 26 is similarly secured to a connecting rod 54, that is, in turn, pivotally connected by a pin 56 to spaced lugs 58 formed on the housing 52 and displaced 180° from the lugs 50.

For the purpose of imparting a constant speed torque to the common shaft 33, each of the clutches 34 and 35 includes two overrunning clutch mechanisms indicated at 60, 62 and 64, 66, respectively, the clutch mechanisms being adapted to transmit power from their respective power sources which in this case are represented by the opposed pistons Nos. 1 and 2 and Nos. 3 and 4 respectively. Referring to FIG. 3, the overrunning clutch mechanism 60 is illustrated and includes a roller engaging surface 68 that is defined by the inner wall of the housing 40 and forms a continuous, circumferential clutching surface. (See Patent No. 2,892,522.). A series of camming surfaces 70 are spaced inwardly of the roller engaging surface 68 and cooperate therewith to retain rollers 72 therebetween. As illustrated and described in Patent No. 2,892,522, a series of wedge-like spaces are formed between the several camming surfaces 70 and the roller engaging surface 68. Thus the rollers 72 are constantly urged toward the narrow ends of the wedge-like spaces, so that they may immediately become wedged into clutching engagement whenever torque is applied to the housing 40 by the reciprocating motion of pistons No. 1 and No. 2. It is understood that the other clutching mechanisms 62, 64 and 66 are constructed similarly to the clutching mechanism described above. In operation of the engine, the connecting rods 37, 41 and 46, 54 are reciprocated by their respective pistons Nos. 1 and 2 and Nos. 3 and 4 to cause housings 40 and 52 to oscillate. Since each piston transmits power in the same direction, the roller clutching mechanism of both clutches 34 and 35 will cooperate to impart a continuous rotation to the shaft 33.

As described above, the shaft 33 to which the overrunning clutches 34 and 35 are operatively connected for producing continuous rotation thereof, is journalled for rotation in the central housing 12 of the block 10 and for this purpose includes a collar 74 that is keyed to the left end of shaft 33 as seen in FIG. 1, the collar 74 terminating in an integral outer flange 76. The collar 74 extends through an opening formed in an end cap 78, the end cap 78 being secured to a reduced end 80 of the housing 12 by bolts 82. The collar 74 engages the inner race of a ball bearing 84 that is adapted to rotatably mount the left end of the shaft 33 while secured to the flange 76 by bolts 86 is a flywheel 88 that is adapted to stabilize operation of the shaft 33 when torque is applied thereto. A nut 90 threadably engages an outer extension 92 of the shaft 33 and cooperates with a washer 94 to retain the collar 74 in the assembled position thereof. An oil seal 96 that is mounted in a recess formed in the end cap 78 is positioned on a bushing 98 and bears against a shoulder defined by the outer end of the bearing 84, the oil seal 96 being adapted to prevent leakage of lubricating oil exteriorly of the central housing 10 by way of shaft 33. A washer 99 is located between the bearing 84 and an annular reduced portion 100 of the clutch housing 52 to properly position the bearing 84 for receiving the shaft 33 therein, while the reduced portion 100 of the clutch housing 52 has a bushing 102 positioned therein that rotatably receives a stepped up portion of the shaft 33 therein.

The other end of the shaft 33, that is, the end opposite the flywheel 88 is journalled for rotation in a ball bearing assembly indicated at 104 that is secured in an opening formed in the end wall 13 of the central housing 12. An end cap 106 is secured to the end wall 13 by bolts 108 and includes a recessed portion that engages the outer race of the ball bearing assembly 104 thereby retaining the assembly in position in the end wall 13. The end cap 106 is mounted on a bushing 110 that cooperates with an oil seal 112 to effectively seal the shaft 33 from exterior leakage of lubricating fluid. Keyed to the outer end of the shaft 33 is a pulley 114 that is retained thereon by a lock nut 116 and a lock washer 118. Although not shown accesories such as a water pump or a generator may be operatively driven by the pulley 114 through suitable belting as is well known in the art.

Figure 8:
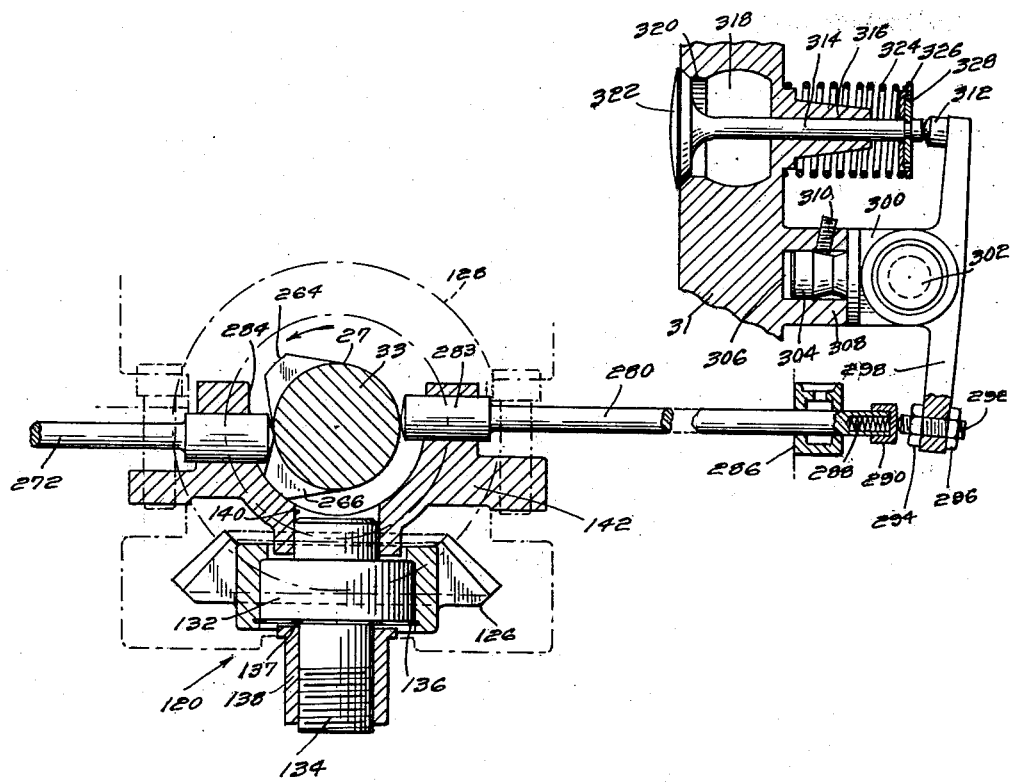
FIG. 8 is a sectional view taken along line 8—8 in FIG. 1, the valve construction as illustrated having been rotated from its inclined position for purposes of illustration.

In order to coordinate the reciprocating movement of the clutch housings 40 and 52, a bevel gear assembly generally indicated at 120 is provided. As best seen in FIGS. 1 and 8, the bevel gear assembly 120 includes a bevel gear 122 that is suitably secured to the clutch housing 52 for movement therewith, and is rotatably mounted on a bearing 124 that is secured to the shaft 33. A central bevel gear 126 meshes with the bevel gear 122 and also meshes with a bevel gear 128 that is secured to the housing 40 for movement therewith, the bevel gear 128 being mounted for rotation on a bearing 130 that is secured to the shaft 33. Referring to FIG. 8, the bevel gear 126 is shown mounted on a ball bearing unit 132 which is secured to a stud 134 that extends therethrough. A locking disc 136 is secured in the bevel gear 126 and engages the underside of the outer race of the ball bearing unit 132 while a collar 138 threadably engages the threaded outer end of the stud 134 and is fixed in the assembly 120. A locking disc 137 is secured to the stud 134 and acts to lock the inner race of the ball bearing unit 132 in the assembly. The upper end of the stud 134 extends into an opening 140 formed in a valve push rod housing 142 that will be described in more detail hereinafter. It is seen that upon rotation of the stud 134, the central bevel gear 126 will be adjusted to enable the proper meshing of the bevel gears 122, 126 and 128 to be obtained. It is further seen that as the housings 40 and 52 are oscillated by the roller drives therein, the oscillating movement will be synchronized through the bevel gear assembly 120.

Figure 4:
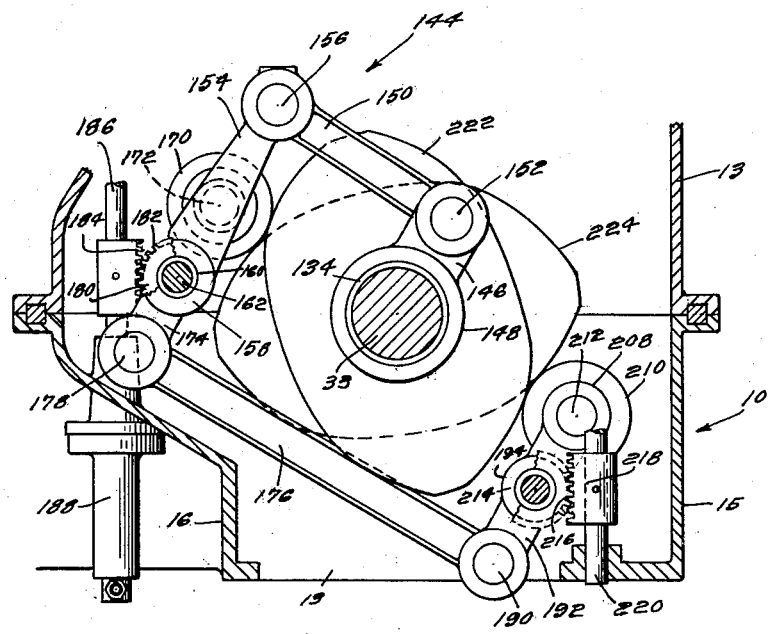
FIG. 4 is a sectional view taken along line 4—4 in FIG. 2.

Due to the construction of the clutching mechanism of the overrunning clutches 34 and 35, a direct drive therethrough from the drive shaft 33 to the clutch housings 40 and 52 cannot be effected. Hence in starting the engine a special arrangement must be provided in order to cause the oscillating movement of the housings 40 and 52, such movement being necessary to produce the necessary motion for reciprocating the engine pistons during the starting phase of the engine. Referring now to FIGS. 2 and 4, a linkage system for imparting the necessary oscillating movement to the housings 40 and 52 for starting the engine is generally indicated at 144 and includes a bifurcated lever 146 that is connected directly to the housing 40 and is mounted on a reduced hub 148 that is formed as an extension of the housing 40. As shown in FIG. 1, the shaft 33 extends through the hub 148 and is adapted to be rotatable with respect thereto, a bushing 135 providing for relative rotation therebetween. As shown more clearly in FIG. 4, one end of a link 150 is pivotally connected to the bifurcated lever 146 by a pin 152, the other end of the link 150 being pivotally connected to a lever 154 by a pin 156. As seen in FIG. 2, the lever 154 is joined to a hub 158, that is mounted on a bushing 160 and journalled for movement on a cross shaft 162, the axis of the hub 158 being substantially parallel with respect to the shaft 33. The cross shaft 162 is mounted in shock absorbing bushings 164 and 166 that are spaced apart and have bearing engagement with the housing 12 of the cylinder block 10 and a cap 169 is fixed to the housing wall 13 and locks the cross shaft 162 in position in the bushings 164, 166. Spacing washers 165 and 167 are positioned at the ends of the hub 158 and are adapted to properly space the hub between shoulders formed on the portion of the housing 12 in which the shock absorbing bushings 164, 166 are located.

Joined to the hub 158 and located to the right of lever 154 as seen in FIG. 2 is a lever 168 to which a cam follower 170 is secured by a pin 172. Also secured to the hub 158 and positioned to the right of the lever 168, as seen in FIG. 2, is a lever 174 to which a link 176 is pivotally secured by a pin 178. As shown more clearly in FIG. 4, a pinion 180 is mounted on the hub 158 for movement therewith and includes a toothed portion 182 that meshes with a rack 184, the rack 184 being formed as part of a pump plunger 186 that is an extension of a gasoline pump indicated at 188. It is seen that upon pivotal movement of the levers 154 and 174, the pinion 182 will be caused to oscillate, thereby reciprocating the rack 184 and resulting in a pumping action of the gasoline pump 188.

Pivotally joined to the other end of the link 176 by a pin 190 is a lever 192, the lever 192 being joined to a hub 194 that is parallel to the hub 158. The hub 194 is constructed similarly to the hub 158 and is mounted for rotation on suitable bushings that surround a shaft 196, the shaft 196 being fixed in shock absorbing bushings 198, 200 that are secured in the housing 12. Spacing washers 202, 204 properly position the hub 194 in the housing 12 and an end cap 206 is secured to the housing end wall 13 and properly positions the shaft 196 in the cylinder block housing. Fixed to the hub 194 and positioned to the right of lever 192 as seen in FIG. 2 is a lever 208 on which a cam follower 210 is mounted by means of a pin 212. Fixed to the hub 194 and positioned to the left of levers 192 and 208 is a pinion 214 that is formed with a toothed portion 216 that engages a rack 218. The rack 218 is fixed to a plunger 220 that is formed as part of a lubricating or oil pump for circulating lubricating fluid through the engine.

Loosely mounted on the shaft 33 but operatively connected thereto as will be described hereinafter are drive cams 222 and 224 that are located in spaced relation and have a generally elliptical configuration. As seen in FIGS. 2 and 4, the drive cam 222 is located in engagement with the cam follower 170 while drive cam 224 engages the cam follower 210. Due to the elliptical configuration of the drive cams, the cam followers 170 and 210 are adapted to be moved in a particular manner which movement is determined by the configuration of the cams. Thus as the followers 170 and 210 follow the contours of the cams 222 and 224 during the rotation thereof the linkage system 144 is actuated, resulting in a reciprocating action of the links and levers associated therewith, which movement causes the link 150 to be oscillated, thereby oscillating the housing 40 of the clutch 34. Since the housing 40 is interconnected to the housing 52 through the bevel gear assembly 120, continuous rotation of the cams 222 and 224 will produce an oscillating movement of the housing 52. The oscillating movement of the housings 40 and 52 is then transferred into reciprocating movement of the pistons which produce the necessary torque for starting the engine.

Referring now to FIGS. 1 and 9-11, the interconnection of the drive cams 222 and 224 with the drive shaft 33 is illustrated. As shown more clearly in FIG. 9, the drive cam 222 is formed with central hub portions 226 and 228 that project outwardly from the drive cam 222 on opposite sides thereof. Formed on the hub portion 228 are a plurality of teeth 230 that are adapted to interengage similar teeth on the opposing hub portion of the drive cam 224 and thereby define one face of a driving clutch member. Formed on the drive cam 224 are opposed hub portions 232, 234 that project outwardly therefrom on opposite sides thereof. Both of the hub portions 232, 234 of the drive cam 224 are provided with the clutch teeth as indicated at 236 and 238, the clutch teeth 236 intermeshing with the clutch teeth 230 that are formed on the hub portion 228 of the drive cam 222. The drive cams 222 and 224 are thus intermeshed in locked relation and are adapted to rotate as a unit on the shaft 33 with a minimum of backlash. In order to provide a driving connection to the drive cams 222 and 224 from the drive shaft 33, the clutch teeth 238 of the hub portion 234 mesh with clutch teeth 242 of a collar 244 on which is formed a driving gear 246. As shown in FIG. 1, the driving gear 246 is splined to the drive shaft 33 and is rotatable therewith so that rotation of the drive shaft 33 produces a corresponding rotation of the drive cams 222 and 224 mounted thereon. The driving gear 246 is positioned in engaging relation with the ball bearing unit 104 which prevents longitudinal movement thereof, while interengaging the driving gear 246 in meshing relation therewith is a gear 248 that in turn drives a gear 250 that is directly connected to a distributor drive through a bevel gear 252. The bevel gear 252 and gear 250 are rotatably mounted on a shaft 253 that is mounted in the end wall 13 of the cylinder block housing 12. A bevel gear 254 which is operatively connected to a distributor drive shaft 256 meshes with the bevel gear 252, and it is seen that upon rotation of the driving gear 246, the distributor drive shaft 256 will be rotated to operate the engine distributor in a manner that is well known in the art.

In the starting phase of the engine, the drive cams 222 and 224 are utilized to initially produce an oscillating movement of the housings 40 and 52 of the clutch members 34 and 35 and for this purpose a conventional starter may be mounted at the end of the shaft 33 adjacent the flywheel 88. Rotation of the shaft 33 by means of the starter will produce a corresponding rotation of the drive gear 246. The drive cams 222 and 224 are thus caused to rotate with the drive shaft 33 through the interengagement of the hub portion 228 and 234 by their respective clutch teeth and a corresponding oscillating movement of the linkage system 144 is then produced. The housing 40 of the clutch member 34 is thus oscillated in accordance with the movement of the drive cams 222 and 224, and produces a corresponding oscillating movement of the housing 52 through the bevel gear assembly 120. The pistons associated with the clutch members 34 and 35 are then reciprocated and upon introduction of fuel into the combustion chambers of the various cylinders, in response to rotation of the drive shaft 33, the engine will be started. Although the drive cams 222 and 224 have been described in connection with the starting phase of the engine, they are also utilized during normal operation of the engine as a control means during deceleration. Thus on downhill movement of the vehicle for example, a braking action on the drive shaft 33 would be effected by means of the drive cams 222 and 224.

Unlike the internal combustion engine in use heretofore, the present invention dispenses with the complicated cam shaft and rocker arm construction that was normally utilized for controlling the operation of the fuel inlet and exhaust valves associated with each of the engine cylinders. Referring to FIGS. 1 and 2, a plurality of valve control cams indicated at 260, 262, 264 and 266 are shown mounted directly on the drive shaft 33 for rotation therewith and are centrally positioned between the clutch members 34 and 35 and within the space defined by the bevel gears 122 and 128 of the bevel gear assembly 120. As shown in FIG. 8, and as will be more fully described hereinafter, the valve control cams are located such that the lobes or high points thereof are disposed in staggered relation and in accordance with a predetermined sequence of operation. In order to provide for the predetermined sequence of operation in controlling the movement of the inlet and exhaust valves of the engine cylinders, a plurality of valve control push rods are provided and are adapted to coact with the valve controls cams. As shown in FIG. 2, a bank of four push rods 268, 270, 272 and 274 are disposed in engagement with the cams 260, 262, 264 and 266, respectively, on one side thereof. Engaging the valve control cams on the other side thereof is a bank of four push rods 276, 278, 280 and 282. Referring to FIGS. 16a and 16b, the cams 260, 262, 264 and 266 are each shown formed with a lobe that is positioned in a predetermined manner with respect to the lobes of the other cams. This predetermined positioning of the lobes of the cams 260-266 with respect to each other enables the banks of push rods to be actuated in a predetermined sequence so as to properly open and/or close the inlet and exhaust ports of the various cylinders in timed relation.

As will be more fully discussed in the operation of the engine, each of the valve push rods operates a particular valve for one of the engine cylinders. Referring now to FIG. 8, the cam 264 and the valve push rod 280 and the associated assembly for actuating the inlet valve of cylinder 23 is illustrated, and it is understood that the other cylinder valves and valve push rods and associated assemblies are constructed and operated similarly to that shown in FIG. 8. Secured to the inner end of the push rod 280 is an enlarged portion 283 that extends in bearing relation through an opening formed in the housing 142, the housing 142 being secured to the cylinder block housing 12 of the engine. The housing 142 is formed with a central saddle portion 284 through which the shaft 33 extends and in which the valve control cams are positioned. The outer end of the push rod 280 extends through a bearing housing 286 (FIG. 8) and is formed with an opening in which a spring 288 is positioned, the spring 288 urging a cap 290 into engagement with an adjusting screw 292 that is locked by nuts 294, 296 in the outer end of a rocker arm 298. The rocker arm 298 is pivotally mounted in a bearing 300 by a pin 302. The bearing 300 includes a projection 304 that is positioned in an opening 306 formed in an extension 308 that is formed as part of the manifold casing 31, the bearing 300 being locked in the opening 306 by a set screw 310. The rocker arm 298 is mounted on the bearing 300 intermediate the ends thereof and includes a contact button 312 that is secured to the end thereof opposite the adjustment screw 292, the contact button 312 engaging the outer end of a valve stem 314. The valve stem 314 extends through a boss 316 formed on the manifold casing 31 that has an opening therein through which the valve stem 314 extends. A passage 318 is formed adjacent a port 320, access through the port 320 being controlled by a valve 322 that is integrally joined to the valve stem 314. Although not shown the passage 318 communicates with an inlet manifold as will hereinafter be described. It is seen that upon linear movement of the push rod 280 the rocker arm 298 will be pivotally actuated to cause the valve 322 to open the port 320. A spring 324 surrounds the boss 316 and the valve stem 314 and is secured to the valve stem 314 by lock washers 326 and 328 in the conventional manner and acts to normally retain the valve 322 in the closed position thereof. As the cam 264 moves the push rod to the right as seen in FIG. 8, the rocker arm 298 will be pivoted to move the valve 322 to the open position thereof, thereby biasing the spring 324. Upon movement of the bearing 288 off of the lobe of the cam 264, the spring 324 will cause the valve 322 to close thereby actuating the rocker arm 298 and moving the push rod to the left as seen in FIG. 8. It is understood that the valve 322 may be adjusted with respect to the degree of opening thereof by means of the adjustment screw 292.

In the above description of the valve and push rod assembly, the rocker arm 298 and the associated valve components are shown located such that the elements thereof are disposed in vertical relation with respect to the push rod 280. However, as illustrated in FIG. 2 in the actual assembly of the rocker arm and valve assembly they are inclined with respect to the push rod. However, for purposes of illustration and to clarify the invention, the rocker arm and valve assembly are shown as indicated in FIG. 8.

Figure 5:
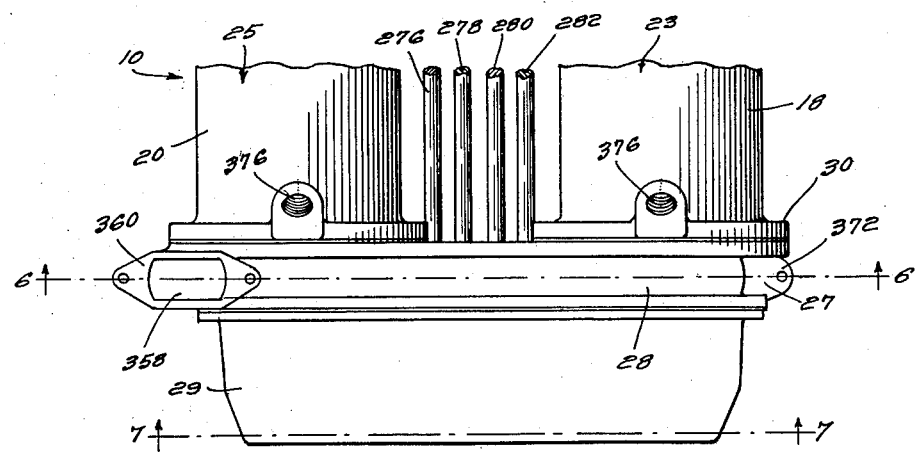
FIG. 5 is a top plan view of one end of a manifold housing that is mounted on a pair of the engine cylinders, the spark plugs for the cylinders being shown removed from the openings provided therefor.
Figure 7:
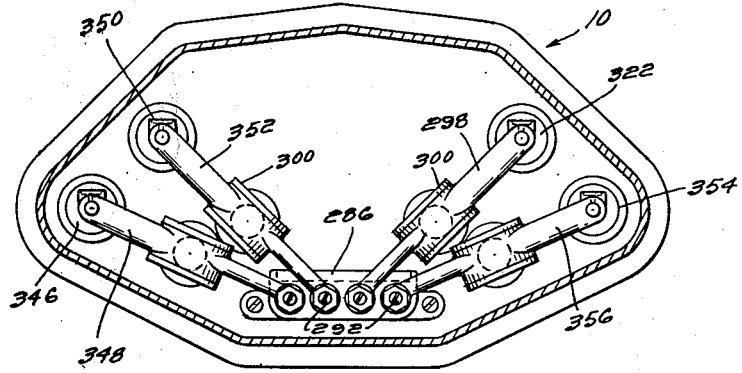
FIG. 7 is a sectional view taken along line 7—7 in FIG. 5.

Referring to FIGS. 2, 5 and 7, the relation of the push rods and their respective valves to the various cylinders is illustrated, the push rods 268–274 extending through a bearing housing 329, similar to aforedescribed bearing housing 286, that is secured to the manifold casing 28. As shown in FIG. 2, cylinder 26 is provided with an inlet valve 330 and an exhaust valve 332 which are adapted to be actuated by rocker arms 336 and 334, respectively. The rocker arm 334 is adapted to be moved in response to movement of the push rod 268, while the rocker arm 336 is adapted to be moved in response to movement of the push rod 270. Similarly, cylinder 24 is provided with an inlet valve 338 and an exhaust valve 340, the inlet valve 338 being controlled by movement of a rocker arm 342, which is actuated by push rod 272, while the valve 340 is controlled by movement of a rocker arm 344 that is actuated by movement of the push rod 274. The entire valve and rocker arm assembly controlling the operation of cylinders 24 and 26 is enclosed by the cover 32 that is adapted to be secured to the manifold casing 30.

Referring to FIG. 7, the opposite end of the engine is illustrated and includes an exhaust valve 346 for cylinder 25 that is controlled by movement of a rocker arm 348 which is actuated by push rod 276. An inlet valve 350 for cylinder 25 is provided and is controlled by movement of rocker arm 352 that is actuated by push rod 278. As described hereinabove, valve 322, which is the inlet for cylinder 23 is controlled by operation of push rod 280 and rocker arm 298. An exhaust valve 354 controls the exhaust from cylinder 23 and is actuated by a rocker arm 356 that is controlled by movement of the push rod 282. It is understood that all of the inlet and exhaust valves illustrated are formed and constructed similarly to that described above in connection with valve 322 and the rocker arm assemblies for operating the valves are also constructed in a manner similar to that described above.

Figure 6:
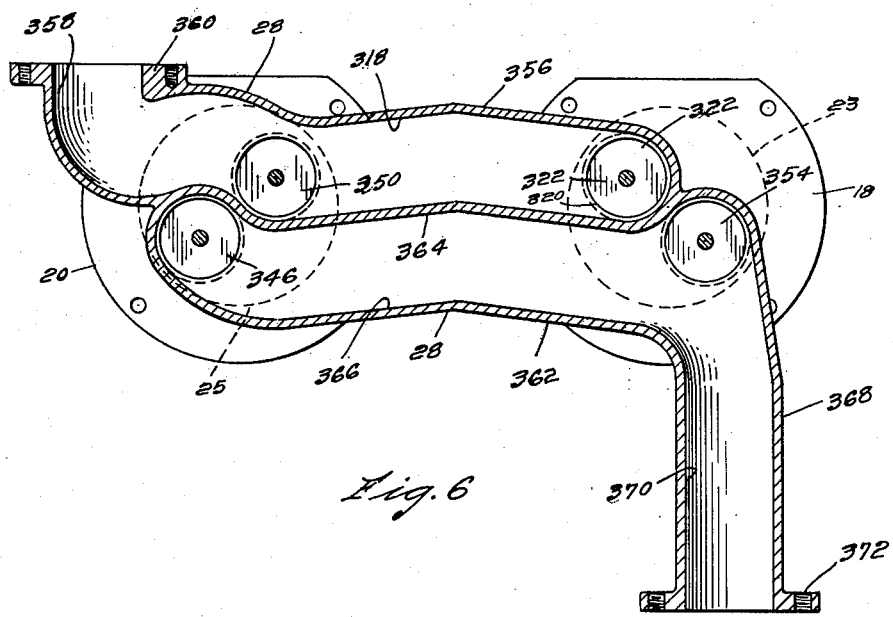
FIG. 6 is a sectional view taken along line 6—6 in FIG. 5.

Referring now to FIG. 6, the manifold casing 28 is illustrated in detail and as shown includes the manifolding for the cylinders 23 and 25. Communicating with the inlet valves 350 and 322 of cylinders 25 and 23 respectively is the passage 318 that is formed in an inlet manifold 356. Adapted to be joined to the inlet manifold 356 at the inlet thereof, indicated at 358, and secured to a flange 360, is a conduit (not shown) that communicates with the engine carburetor and that supplies the fuel mixture to the cylinders 25 and 23. The manifold casing 28 also includes an exhaust manifold 362 that is separated from the inlet manifold 356 by a common wall 364, a passage 366 being formed in the exhaust manifold 362 and communicating with the exhaust valves 346 and 354 of the cylinders 25 and 23. Integrally joined to the exhaust manifold 362 is an outlet pipe 368 that defines an outlet passage 370, a flange 372 being formed on the outer end of the outlet pipe 370 and being adapted to be secured to a conventional muffler connection (not shown) by suitable bolts. It is understood that the distributor and carburetor for the engine may be of any conventional design, the distributor being electrically connected to spark plugs 374 (FIG. 3) that are mounted in threaded openings 376 (FIG. 5) formed in the various cylinders, while the engine carburetor is operatively connected to the flange or carburetor mounting 360 and is adapted to distribute the air-fuel mixture to the inlet manifold 356. Since the cams 260–266 are operated in accordance with the speed of rotation of the shaft 33, the inlet valves of the various cylinders will be opened and closed in timed relation to admit the air-fuel mixture into the cylinders, while the exhaust valves are similarly opened and closed in timed relation to exhaust the combustion products from the cylinders. Although only the manifolding for the cylinders 23 and 25 has been described, it is understood that the manifolding for cylinders 24 and 26 is similar to that just described.

Referring to FIGS. 16a, 16b, and 17, the cams 260, 262, 264 and 266 and their respective push rods are shown in detail, the designation of each of the push rods with respect to its relationship with the cylinder valves and the pistons associated with each cylinder being indicated. Thus, cam 260 is adapted to actuate push rods 268 and 276, the push rod 268 controlling the exhaust valve 332 for cylinder 26 in which piston No. 4 is located, and the push rod 276 controlling the exhaust valve 346 for cylinder 25 in which piston No. 3 is located. Similarly cam 262 actuates push rods 270 and 278, the push rod 270 controlling the inlet valve 330 for cylinder 26 and the push rod 278 controlling the inlet valve 350 for the cylinder 25. Cam 264 actuates the push rods 272 and 280, push rod 272 controlling the operation of the inlet valve 338 for cylinder 24 in which piston No. 2 is located, and push rod 280 controlling the operation of inlet valve 322 for cylinder 23 in which piston No. 1 is located. Finally, cam 266 actuates the push rods 274 and 282, the push rod 274 controlling the operation of the exhaust valve 340 in cylinder 24 and the push rod 282 controlling the operation of the exhaust valve 354 in cylinder 23. As shown in FIG. 16a and 16b, each of the cams 260–266 is formed with a lobe that is preset with respect to the other cams and engages the associated push rod so as to actuate or move the push rods at a predetermined time in the sequence of operation of the engine. Thus the various inlet and exhaust valves will be opened and closed at the proper interval and in timed sequence.

Figure 12:
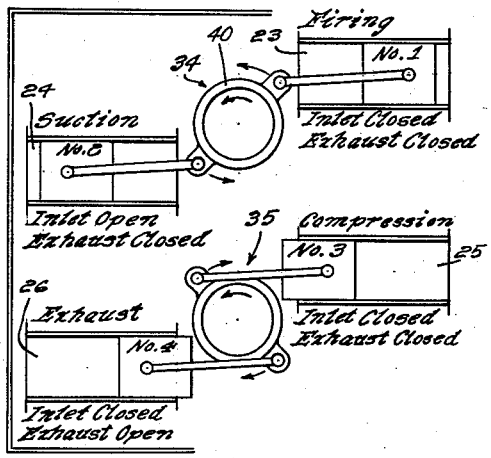
FIGS. 12 through 15 are diagrammatic illustrations of the positions of the engine pistons during the operation of the engine and their relation with respect to the clutch member to which they are operatively connected, the positions of the inlet and exhaust valves associated with each of the cylinders being indicated for each quarter revolution of the drive shaft.
Figure 14:
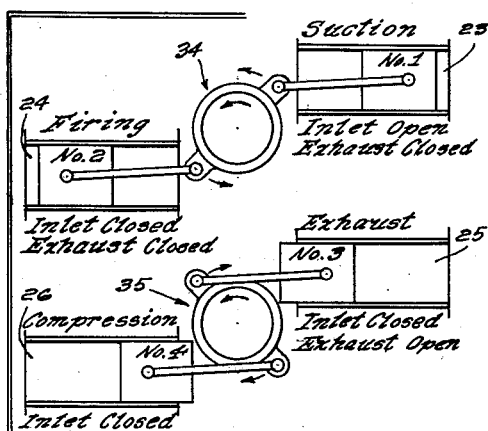
Figure 13:
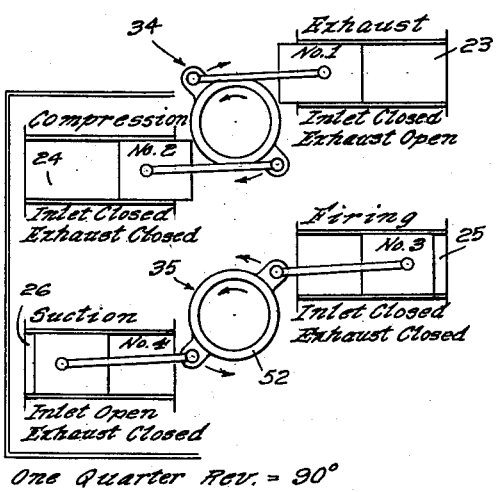
Figure 15:
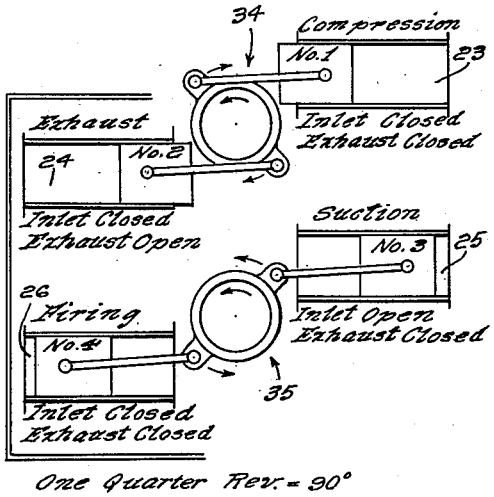

In order to illustrate sequence of operation during one complete revolution of the drive shaft, the position of each of the pistons in their respective cylinders and the relationship of the associated inlet and exhaust valves will be described and reference is now made to FIGS. 12–15. In FIGS. 12–15 the cylinders 23, 24, 25 and 26 are diagrammatically illustrated and are shown operatively connected to the clutch member associated therewith, the operating position of each piston being indicated together with the position of the inlet and exhaust valves for each cylinder. In FIG. 12, the No. 1 piston which is disposed in cylinder 23 and is connected to clutch member 34 is located in the position when explosion occurs. In this instance, both the inlet valve 322 and exhaust valve 354 are closed. At this point the opposed piston No. 2 disposed in cylinder 24 is also connected to clutch member 34 and is located at the suction position wherein the inlet valve 338 is ready to open and the exhaust valve 340 is closed. In this same position the No. 3 piston located in cylinder 25 and operatively connected to clutch member 35 is located in the position of compression wherein both the inlet valve 350 and the exhaust valve 346 are closed. The No. 4 piston disposed in cylinder 26 and also connected to clutch member 35 is located in the exhaust position, wherein the exhaust valve 332 is ready to open and the inlet valve 330 is closed. The position of the valves as illustrated in FIG. 12 is maintained for one quarter of a revolution of the shaft 33. In the next quarter of a revolution of the shaft 33, the position of the pistons 1, 2, 3 and 4 is illustrated in FIG. 13 and it will be noted that the housing 40 of the clutch member 34 has been oscillated to the opposite position wherein the No. 1 piston has been moved to the left. In this position the combustion products in cylinder 23 are to be discharged and accordingly exhaust valve 354 is ready to open while the inlet valve 332 is closed. The No. 2 piston is now in the position of compression wherein both the inlet valve 338 and exhaust valve 340 of cylinder 24 are closed. At this point of the movement of the shaft 33 the clutch member 35 has been oscillated to the position opposite that of clutch member 34 wherein the No. 3 piston located in cylinder 25 is in the firing position and both the inlet valve 350 and the exhaust valve 346 are closed. The No. 4 piston is now at the suction position wherein the inlet valve 330 is ready to open and the exhaust valve 332 is closed. In the next phase of operation wherein the shaft 33 has moved one-quarter revolution, the housing 40 of the clutch member 34 has once again been oscillated to the first position described, and the No. 1 piston has moved to the outermost point in the cylinder 23. This is the suction position for piston No. 1, and the inlet valve 322 is ready to open while the exhaust valve 354 is closed. The No. 2 piston is now in the firing position wherein both inlet and exhaust valves 338 and 340 in cylinder 24 are closed. At this point, the housing of the clutch member 35 has been moved to its original location, and No. 3 piston in cylinder 25 is in the exhaust position wherein the exhaust valve 346 is ready to open and the inlet valve 350 is closed. The No. 4 piston is now at the compression position wherein both the inlet and exhaust valves 332 and 330 in the cylinder 26 are closed. The final phase in one revolution of the shaft 33 is illustrated in FIG. 15, wherein No. 1 piston is at the compression position and the inlet valve 322 and the exhaust valve 354 in cylinder 23 are both closed. The No. 2 piston in cylinder 24 is in the exhaust position wherein the inlet valve 338 is closed and the exhaust valve 340 is ready to open. The clutch member 35 is now oscillated in the opposite position to that of clutch member 34 and the No. 3 piston is in the suction position wherein the inlet valve 350 is ready to open and the exhaust valve 346 is closed. The No. 4 piston located in cylinder 26 in this phase of the operation is now in the firing position wherein both the inlet valve 330 and the exhaust valve 332 are closed. It is understood that in all phases of the operation of the various pistons as described above in connection with FIGS. 12 through 15, the cams 260–266 control the operation of the valves to produce the various engine functions as described.

As the pistons are reciprocated in their cylinders, the housings 40 and 52 are oscillated, and due to the construction of the clutch members 34 and 35 which is described in detail in Patent No. 2,892,522, a continuous rotation of the shaft 33 will be produced. Due to the fact that there are two roller drives in each of the clutch members 34 and 35, a nearly vibrationless action is obtained that is not possible in the prior known internal combustion engines. In starting, the drive cams 222 and 224 are utilized to produce the initial oscillating action of the housings 40 and 52 of the clutch members 34 and 35, and during deceleration act to produce a braking effect on the engine. By reason of the fact that the axes of the cylinders of the engine are disposed in a substantially horizontal position, an extremely compact engine is produced and moreover, the elimination of the conventional crankshaft and camshaft avoids complicated linkage systems which reduces lubrication problems.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. In an internal combustion engine, a housing, a drive shaft mounted for rotation in said housing and extending therethrough a clutch member of the overrunning type that is adapted to translate oscillating motion into continuous rotary motion, said clutch member being operatively connected to said drive shaft and positioned in said housing, a plurality of opposed cylinders joined to said housing, the axes of said opposed cylinders being substantially horizontal and being perpendicular with respect to the axis of said drive shaft, the axes of each pair of opposed pistons being displaced with respect to the vertical, inlet and exhaust valves communicating with said cylinders, pistons mounted for reciprocating movement within said cylinders and being operatively joined to said clutch member, a plurality of cams mounted directly on said shaft, means operatively engaging said cams and interconnected to said inlet and exhaust valves, said engaging means including pairs of opposed rods that are responsive to a single cam, said cams being responsive to the rotation of said drive shaft for controlling the operation of said inlet and exhaust valves, and said pistons being responsive to the operation of said valves to produce an oscillating motion in said clutch member, the oscillating motion being translated by said clutch member into continuous rotary motion of said shaft, and means for starting said engine including a pair of drive cams mounted on said shaft and drivingly interconnected thereto, and linkage means operatively connected to said clutch member and responsive to rotation of said drive cams for imparting an oscillating motion to said clutch member.

2. In an internal combustion engine, a housing, a drive shaft mounted for rotation in said housing, clutch members of the overrunning type operatively connected to said drive shaft in spaced relation with respect to each other, a plurality of cylinders, the axes of which are substantially horizontal and are disposed in perpendicular relation with respect to the axes of said drive shaft, inlet and exhaust valves communicating with said cylinders, pistons mounted for reciprocating movement within said cylinders and operatively connected to said clutch members, said pistons being located in opposed pairs, the axes of which are displaced with respect to the vertical, said clutch members being oscillated by the reciprocating movement of said pistons and translating said oscillating motion into continuous rotary motion of said drive shaft, cam means responsive to rotation of said drive shaft for controlling the operation of said inlet and exhaust valves, and means for starting said engine including drive cams mounted on said shaft and operatively connected thereto, linkage means operatively connecting said drive cams to said overrunning clutch members and responsive to rotation of said drive shaft to induce an oscillating movement in said clutch members, the oscillating movement being transferred into reciprocating motion of said pistons.

3. In an internal combustion engine as set forth in claim 2, said cam members being freely mounted for rotation on said drive shaft and clutched in engagement together, a drive collar splined to said drive shaft and responsive to rotation thereof, said drive collar transferring the drive from said drive shaft to said drive cams.

4. In an internal combustion engine as set forth in claim 2, said linkage means including a first link pivotally connected to one of said clutch members and to an adjacent first lever, a cam follower mounted on said lever in engagement with one of said drive cams and responsive to movement thereof for imparting a reciprocating movement to said lever, a second link pivotally connected to said first lever and to a second lever, a second follower mounted on said second lever in engagement with the other drive cam, wherein rotation of said drive cams produces a corresponding reciprocating motion in said levers, said drive cams being further adapted to brake said drive shaft during deceleration of said engine.

5. In an internal combustion engine, a drive shaft, overrunning clutch members operatively connected to said drive shaft and adapted to translate reciprocating motion into continuous rotary motion, a plurality of cylinders in each of which a piston is mounted for reciprocating movement, inlet and exhaust valves associated with each cylinder for controlling the operation of said pistons, a bevel gear assembly mounted on said shaft for interconnecting said clutch members and synchronizing the reciprocating movement thereof, a plurality of cams secured to said drive shaft and positioned in close proximity to said bevel gear assembly between said clutch members, said cams controlling the operation of said inlet and exhaust valves and thereby controlling the sequence of operation of said pistons in accordance with the rotation of said shaft, and a pair of drive cams freely mounted on said drive shaft, means drivingly connecting said shaft to said drive cams, and linkage means including followers that engage said drive cams, said linkage means being operatively connected to said clutch members and being adapted to impart a reciprocating motion thereto in response to rotation of said drive cams during the starting phase of said engine.

6. In an internal combustion engine as set forth in claim 5, said connecting means including clutch teeth formed on each of said drive cams that interlock to interengage said drive cams for rotation as a unit, one of said drive cams including additional clutch teeth that mesh with clutch teeth formed on a drive collar that is splined to said shaft, said drive cams thereby being responsive to rotation of said drive shaft to cause a corresponding movement of said linkage, whereby said drive cams and said linkage define retarding means for said drive shaft during normal operation thereof.

7. In an internal combustion engine, a drive shaft, overrunning clutches operatively connected to said drive shaft and adapted to translate reciprocating motion into continuous rotary motion, a plurality of pistons arranged in opposed pairs and engaging said clutches, the axes of said opposed pairs of pistons being displaced with respect to each other, said pistons being reciprocated for producing an oscillating motion in said clutches, means for sequentially controlling the operation of said pistons, said control means including valve means, means operatively connected to said valve means for controlling the movement thereof, cam means mounted for rotation on said drive shaft and engaging said connecting means, said cam means moving said connecting means in a predetermined sequence and in response to rotation of said shaft to sequentially control said valve means, and means for applying a starting torque to said drive shaft and for braking said drive shaft during the normal operation of said engine, said torque applying and braking means including a pair of drive cams freely mounted on said drive shaft and interconnected thereto through a driving connection, a linkage assembly operatively connected to one of said clutches and including followers that engage said drive cams and are responsive to the rotation thereof, said linkage assembly transferring the rotary motion of said drive cams into an oscillating motion of the clutch connected thereto, whereby said pistons are caused to be reciprocated during the starting phase of the engine.

8. In an internal combustion engine as set forth in claim 7, said linkage assembly further including a series of links and levers that are pivotally interconnected and that are adapted to be moved on their pivot connections in response to the movement of said followers on said rotating drive cams, the pivotal movement of said links and levers being transferred to the clutch connected to said linkage assembly to cause the oscillating movement thereof.

9. In an internal combustion engine as set forth in claim 8, a lubricating pump and a fuel pump operatively connected to said linkage assembly and operated in response to the movement thereof.

10. In an internal combustion engine as set forth in claim 7, said driving connection including a drive collar secured to said drive shaft and having clutch teeth formed on a face thereof, one of said drive cams having a hub one side of which is formed with clutch teeth that drivingly intermesh with the clutch teeth of said drive collar, the other side of said hub being formed with clutch teeth that drivingly intermesh with clutch teeth formed on a hub that is joined to the other of said drive cams, said drive cams thereby being rotatably driven on said drive shaft by said driving connection.

11. In an internal combustion engine, a drive shaft, a pair of overrunning clutches, each having an inner race secured to said shaft and an outer race adapted to drive said shaft when rotated in one direction and adapted to overrun when rotated in the opposite direction, a pair of opposed cylinders associated with each clutch, said cylinders extending perpendicularly from the axis of said shaft, one of each pair of cylinders being located slightly above the center line of said shaft and the other slightly below said center line, pistons in each of said cylinders, and rods connecting each of said pistons with the outer race of their associated clutch, said rods extending substantially tangential to said outer races, with each pair of opposed rods making engagement with its associated outer race at substantially diametrically opposed points, whereby reciprocal movement of each pair of rods will cause siad shaft to rotate a predetermined distance, means coordinated with said pairs of pistons so that as one pair of opposed pistons is causing said shaft to rotate, the other pair is causing its associated clutch to overrun and vice versa, whereby said shaft is continuously driven.

12. The engine of claim 11 further characterized in that said coordinating means comprises inlet and exhaust valves associated with each cylinder for controlling the fuel supply to each said cylinder and the discharge of combustion products therefrom, and means controlling the sequential operation of said valves, said means comprising a plurality of cams, all of which are fixedly mounted on said drive shaft between said pair of clutches, a pair of oppositely extending push rods in engagement with each cam, whereby each cam simultaneously actuates two push rods, and linkage means operated by said push rods for controlling the opening and closing of said valves.

13. The engine of claim 11 further characterized in that said clutch outer races are geared to each other to insure synchronization of their rotary movement.

14. The engine of claim 13 further characterized in that means are provided for initiating oscillatory movement of said clutch outer races in response to rotation of said shaft during the starting of said engine.

References Cited in the file of this patent
UNITED STATES PATENTS

| | | |
|---|---|---|
| 1,177,428 | Melin | Mar. 28, 1916 |
| 1,304,129 | Walk | May 20, 1919 |
| 1,699,803 | Meyers | Jan. 22, 1929 |
| 1,917,180 | Zwick | July 4, 1933 |
| 2,009,493 | Guilford et al. | July 30, 1935 |
| 2,380,778 | Murdock | July 31, 1945 |
| 2,405,016 | Cook | July 30, 1946 |
| 2,779,201 | Hurley | Jan. 29, 1957 |
| 2,843,095 | Prentice | July 15, 1958 |